United States Patent [19]
Weissman et al.

[11] Patent Number: 5,984,477
[45] Date of Patent: Nov. 16, 1999

[54] HELMET MOUNTED DISPLAY WITH IMPROVED SLM ILLUMINATION

[75] Inventors: Paul Weissman, Brewster, N.Y.; Brian Welch, Baie d'urfé, Canada

[73] Assignee: CAE Electronics Ltd., Quebec, Canada

[21] Appl. No.: 09/083,385

[22] Filed: May 22, 1998

[51] Int. Cl.⁶ .................................................. G02B 27/10
[52] U.S. Cl. ................................ 353/28; 359/630; 345/7
[58] Field of Search .................................. 353/28, 30, 81, 353/13, 98; 359/630, 631, 633, 637, 629; 345/7, 8, 9

[56] References Cited

U.S. PATENT DOCUMENTS

| | | | |
|---|---|---|---|
| 5,164,848 | 11/1992 | Firth et al. | 359/630 |
| 5,184,250 | 2/1993 | Lacroix | 359/631 |
| 5,343,313 | 8/1994 | Fergason | 359/83 |
| 5,348,477 | 9/1994 | Welch et al. | 434/43 |
| 5,384,654 | 1/1995 | Iba | 359/630 |
| 5,483,307 | 1/1996 | Anderson | 353/28 |
| 5,486,840 | 1/1996 | Borrego et al. | 359/630 |
| 5,497,270 | 3/1996 | Rud | 359/630 |
| 5,515,122 | 5/1996 | Morishima et al. | 353/28 |
| 5,526,184 | 6/1996 | Tokuhashi et al. | 359/630 |
| 5,539,578 | 7/1996 | Togino et al. | 359/630 |
| 5,546,227 | 8/1996 | Yasugaki et al. | 353/630 |
| 5,585,946 | 12/1996 | Chern | 359/631 |
| 5,587,836 | 12/1996 | Takahashi et al. | 359/630 |
| 5,596,451 | 1/1997 | Handschy et al. | 353/633 |
| 5,644,323 | 7/1997 | Hildebrand et al. | 359/630 |
| 5,661,604 | 8/1997 | Kuba | 359/637 |
| 5,742,436 | 4/1998 | Furter | 359/631 |
| 5,777,795 | 7/1998 | Colucci | 359/633 |
| 5,864,326 | 1/1999 | Rallison | 359/631 |

OTHER PUBLICATIONS

Article "HDTV Virtual Reality" by Brian Welch & Ronald Kruk.

Article "Wide Field of View, Full–Color, High–Resolution, Helmet–Mounted Display" by R.E. Barrette.

*Primary Examiner*—William C. Dowling
*Attorney, Agent, or Firm*—Cantor Colburn LLP

[57] ABSTRACT

The eyepiece of the helmet mounted display optics is formed by a beam splitter eyepiece cube and a spherical mirror to create a magnified virtual image of a rear projection screen mounted to the eyepiece cube at a relatively large distance from the observer. The rear projection screen receives an image from a spatial light modulator display which is illuminated by a separate light source.

16 Claims, 3 Drawing Sheets

HELMET MOUNTED DISPLAY WITH IMPROVED SLM ILLUMINATION

FIELD OF THE INVENTION

The present invention relates to optics for a helmet mounted display. The invention relates further to optics for a helmet mounted display having a large field of view and providing improved illumination of a spatial light modulator image source.

BACKGROUND OF THE INVENTION

Helmet mounted displays are well known in the art. In U.S. Pat. No. 5,348,477 to Welch et al., a helmet mounted display is disclosed in which a rear projection screen image is viewed through a magnifying eyepiece prism. More recently, helmet mounted displays in which a wide field of view is achieved by projection of an SLM image onto a screen or image synthesizing optic before being magnified through an eyepiece are known from U.S. Pat. No. 5,644,323 to Hildebrand et al. and 5,483,307 to Anderson. The use of spatial light modulators and beam splitting cubes in such helmet mounted display optics is known, for example, from U.S. Pat. No. 5,596,451 to Handschy et al.

Difficulties experienced in known prior art systems are typically eye strain or eye fatigue, lack of image resolution, weight of the image optic system which impedes freedom of hand movement in the helmet mounted display, as well as the presence of dangerous voltages or levels of electromagnetic radiation on or near the head. While various prior art systems have attempted to solve such difficulties individually, there is a need for a helmet mounted display having an improved performance which addresses the various difficulties experienced in the prior art.

SUMMARY OF THE INVENTION

It is therefore an object of the invention to provide a helmet mounted display in which a rear projection screen receives a bright, high contrast image from a spatial light modulator.

It is a further object of the present invention to provide a helmet mounted display in which a large field of view is provided.

It is yet another object of the present invention to provide a helmet mounted display in which an eyepiece beam splitter cube is beveled to reduce its weight.

According to the invention, there is provided a helmet mounted display comprising a rear projection screen, an eyepiece for providing a large field of view image of the screen at a viewpoint, a spatial light modulator (SLM), relay optics for relaying an image of the spatial light modulator to the rear projection screen, and illumination optics for relaying light from an optical source to the spatial light modulator and for relaying light modulated by the spatial light modulator to the relay optics. The illumination optics comprise means for collimating light from the optical source to produce a beam of illumination light having a low numerical aperture, and a beam splitter for directing the illumination light onto the spatial light modulator in a normal or perpendicular direction and for directing light reflected from the spatial light modulator toward the relay optics. In this way, the image of the spatial light modulator projected onto the rear projection screen is a high contrast, bright image.

Preferably, the SLM is a polarization state changing SLM, such as a ferroelectric liquid crystal device, and the beam splitter is a polarized beam splitter with the illumination optics further comprising an entry polarizer for polarizing all light directed from said light source to said beam splitter. In this preferred arrangement, substantially all of the light from the light source passing through the entry polarizer is directed by the beam splitter onto the liquid crystal device and substantially all of the light reflected from the liquid crystal device with changed polarization is directed by the beam splitter device onto the screen.

BRIEF DESCRIPTION OF THE DRAWINGS

The present invention will be better understood by way of the following description of a preferred embodiment with reference to the appended drawings in which.

DETAILED DESCRIPTION OF THE PREFERRED EMBODIMENT

Figure 1:
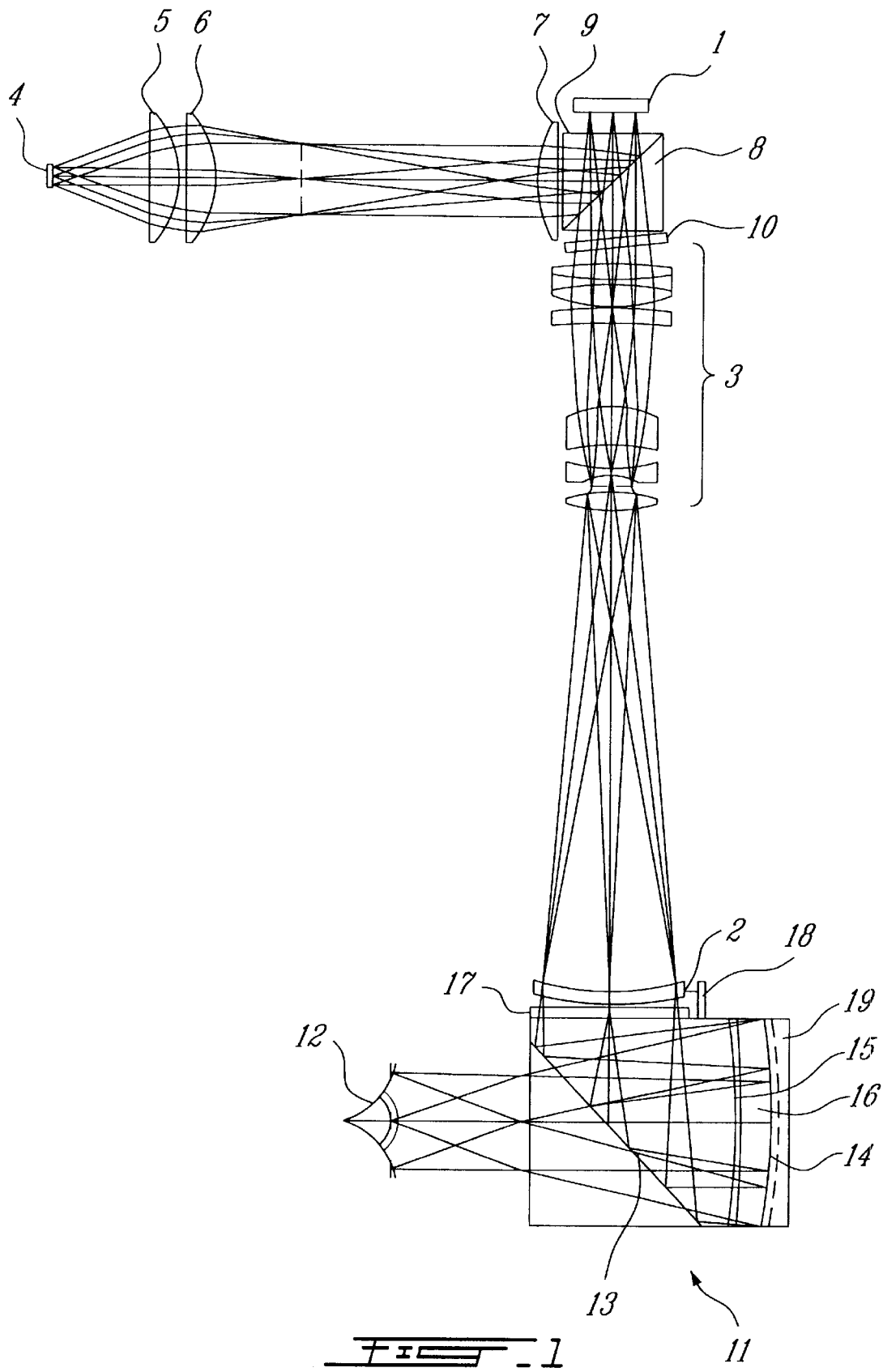
FIG. 1 is a schematic optical diagram of the helmet mounted display optics according to the preferred embodiment.

Referring to FIG. 1, the image formed on the spatial light modulator (SLM) 1, which in the preferred embodiment is a ferroelectric liquid crystal (FLC) device, is projected onto the rear projection screen 2 by the lens assembly 3. The SLM 1 is illuminated by light source 4, which is focused onto the SLM 1 by lenses 5, 6 and 7 via polarizing cube beam splitter 8. The light source 4 may comprise a lamp or an optic fiber cable relaying light from a lamp to lens 5. The lenses 5, 6 and 7 result in a low numerical aperture, collimated beam which is directed normally onto the SLM 1.

The polarizing cube beam splitter 8 reflects light polarized in one direction and transmits light polarized in the orthogonal direction. Light impinging on a pixel in the OFF state is reflected back with the same polarization and re-enters the illumination system via lenses 7, 6 and 5. Light impinging on a pixel in the ON state is reflected back with its plane of polarization rotated 90° and is, therefore, transmitted by the polarizing beam splitter toward the rear projection screen 2. Ferroelectric liquid crystal devices and their operation are known in the art.

Polarizers 9 and 10 serve to reduce unwanted light reaching the rear projection screen 2 and consequently increase the contrast of the image. The first polarizer reduces the amount of light entering the cube 8, however, substantially all of the polarized light entering the cube is reflected by the polarized reflective surface inside cube 8. Although the reflective surface is fully reflective (and not half reflective) for polarized light, the term "beam splitter" is used since splits non-polarized beams into polarized beams.

The image on the rear projection screen 2 is viewed through the cube eyepiece shown generally at 11 by an observer placing his or her eye at viewpoint 12. The basic eyepiece is formed by beam splitter 13 and the spherical mirror 14 which serves to create a magnified virtual image of the rear projection screen 2 at a relatively large distance from the observer. Lenses 15 and 16 provide color correction while lens 17 helps to achieve uniform brightness at the normal viewing position.

A piezoelectric vibrator 18 is used to vibrate the rear projection screen 2 at a sufficiently high frequency that the inherent microstructure of the screen is suppressed and the resolution of the actual image is increased. This technique is well known in the art, such as in U.S. Pat. No. 3,473,562 to Hauber et al.

Figure 2:
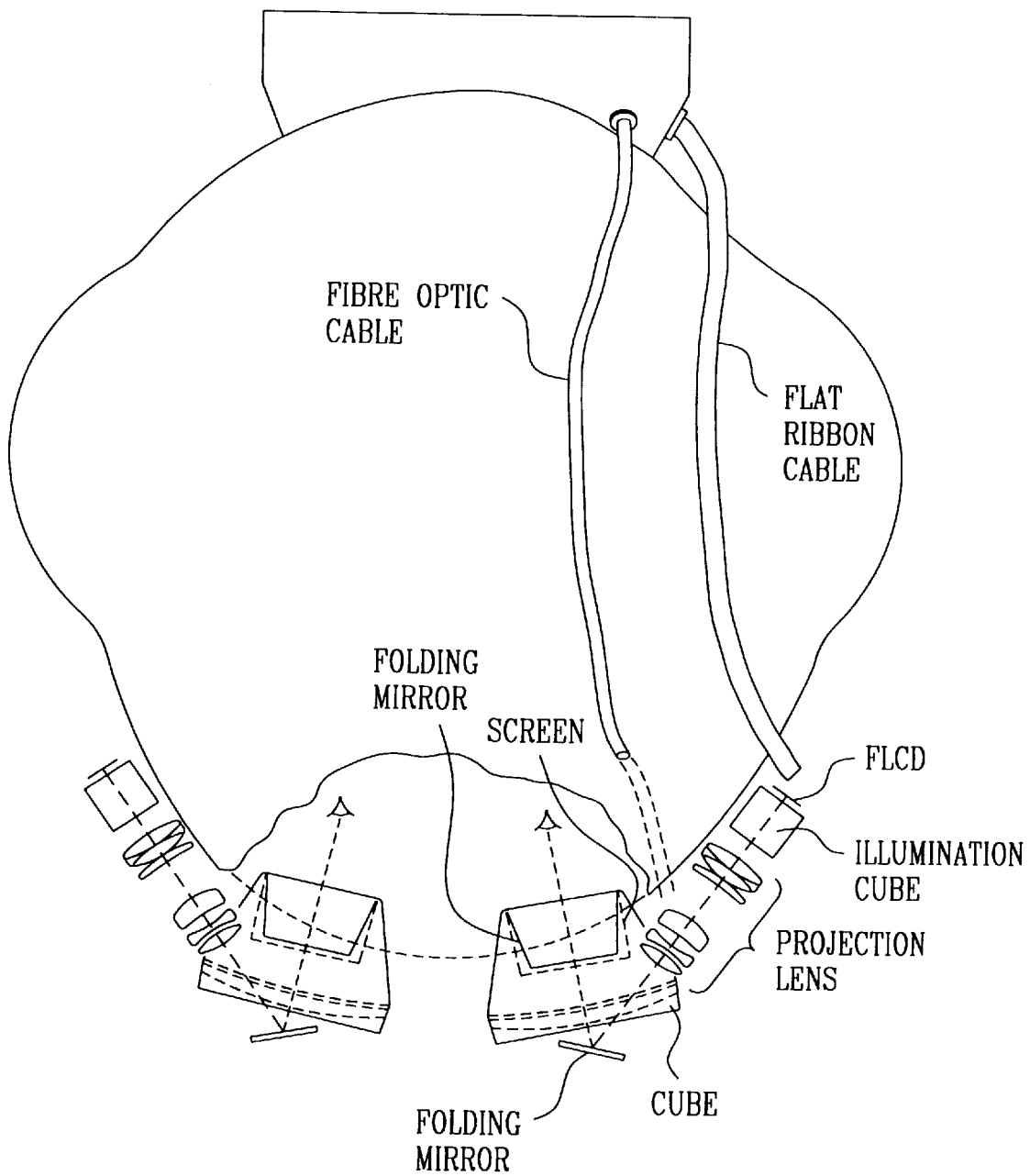
FIG. 2 is a schematic plan view of the helmet mounted display according to the preferred embodiment.
Figure 3:
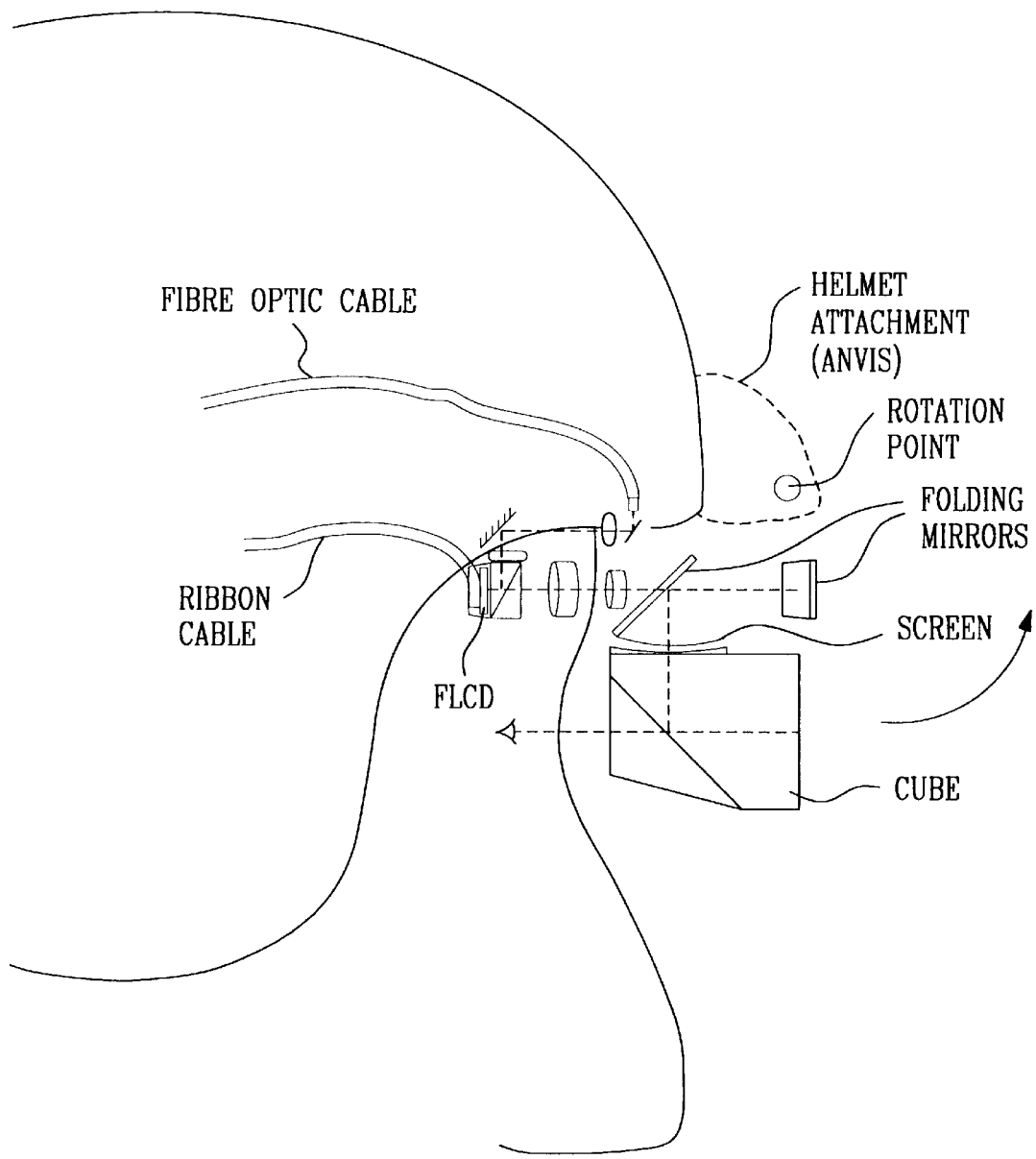
FIG. 3 is a schematic side view of the helmet mounted display according to the preferred embodiment.

For "see through" capability, the spherical mirror 14 is a partially reflecting mirror and lens 19 is added to provide a "see through" magnification of unity. As illustrated in FIGS. 1, 2 and 3, the cube eyepiece 11 has its beam splitting interface 13 extending parallel to a diagonal of the cube offset towards the viewpoint side. This enhances the field of view without affecting the optical quality. Furthermore, as illustrated in FIGS. 2 and 3, the sides of the eyepiece may be beveled in order to reduce the volume and thus the weight of the eyepiece 11. As shown in FIG. 3, the beveled bottom face of the cube is only beveled from the beam splitting interface 13. Likewise, the beveled sides are beveled from the same point rearwardly so as not to disturb the optical quality of the eyepiece.

As can be appreciated, the present invention is particularly advantageous since it allows the optical design of the eyepiece to be optimized for comfortable viewing without regard to the characteristics of the spatial light modulator. The rear projection screen 2 effectively decouples the design of the eyepiece from the design of the spatial light modulator and the illumination system. The size, gain and shape of the rear projection screen is chosen to match the eyepiece characteristics allowing the spatial light modulator to be optimized in accordance with its own particular manufacturing technology. The projection lens assembly 3 provides the required magnification, distortion correction, focal plane curvature, etc. in order to match the eyepiece requirements.

It will be appreciated that the optical schematic shown in FIG. 1 may include several folding mirrors in order to make a compact arrangement for fitting to the observer's head or helmet. FIGS. 2 and 3 show a particularly advantageous arrangement in which two systems are used to create a binocular system. Each system uses four folding mirrors to keep the components close to the shell of the helmet. Other arrangements are also possible and will be apparent to those skilled in the art.

It is to be understood that the foregoing description of a preferred embodiment of the invention is intended merely to illustrate a particular construction of the invention and is not intended to limit the scope of the present invention as defined in the appended claims.

We claim:

1. A helmet mounted display comprising:

a rear projection screen;

an eyepiece means for providing a large field of view image of said screen at a viewpoint;

a spatial light modulator;

relay optic means for relaying an image of said spatial light modulator to said rear projection screen; and illumination optic means for relaying light from an optical source to said spatial light modulator and for relaying light modulated by said spatial light modulator to said relay optic means, said illumination optic means comprising:

means for collimating light from said optical source to produce a beam of illumination light having a low numerical aperture; and a beam splitter for directing said illumination light onto said spatial light modulator in a normal direction and for directing light reflected from said spatial light modulator toward said relay optic means, whereby said image of said spatial light modulator projected onto said rear projection screen is a high contrast bright image.

2. The helmet mounted display as claimed in claim 1, wherein said spatial light modulator is a ferroelectric liquid crystal device.

3. The helmet mounted display as claimed in claim 2, wherein said beam splitter is a polarized beam splitter, and said illumination optic means further comprises an entry polarizer for polarizing all light directed from said light source to said beam splitter, whereby substantially all of said light from said light source passing through said entry polarizer is directed by said beam splitter onto said liquid crystal device and substantially all of said light reflected from said liquid crystal device with changed polarization is directed by said beam splitter device onto said screen.

4. The helmet mounted display as claimed in claim 3, wherein said beam splitter comprises a cube beam splitter.

5. The helmet mounted display as claimed in claim 3, further comprising an exit polarizer for allowing only said differently polarized light to pass to said relay optic means.

6. The helmet mounted display as claimed in claim 1, wherein said eyepiece means comprises a beam splitter cube eyepiece means having a first viewpoint entry face, an opposed spherical mirror face and a diagonal beam splitter means, said screen being mounted to one side of said eyepiece means, wherein an image of said screen is reflected by said diagonal beam splitter means and said spherical mirror through said entry face to said viewpoint proximate said cube eyepiece means.

7. The helmet mounted display as claimed in claim 3, wherein said eyepiece means comprises a beam splitter cube eyepiece means having a first viewpoint entry face, an opposed spherical mirror face and a diagonal beam splitter means, said screen being mounted to one side of said eyepiece means, wherein an image of said screen is reflected by said diagonal beam splitter means and said spherical mirror through said entry face to said viewpoint proximate said cube eyepiece means.

8. The helmet mounted display as claimed in claim 6, wherein said spherical mirror face is partially reflective, further comprising a lens coupled to said spherical mirror for providing a see through magnification of approximately unity.

9. The helmet mounted display as claimed in claim 7, wherein said spherical mirror face is partially reflective, further comprising a lens coupled to said spherical mirror for providing a see through magnification of approximately unity.

10. The helmet mounted display as claimed in claim 1, further comprising vibrator means for vibrating said rear projection screen for suppressing microstructure in said image.

11. The helmet mounted display as claimed in claim 3, further comprising vibrator means for vibrating said rear projection screen for suppressing microstructure in said image.

12. The helmet mounted display as claimed in claim 7, further comprising vibrator means for vibrating said rear projection screen for suppressing microstructure in said image.

13. The helmet mounted display as claimed in claim 6, wherein lateral faces of said eyepiece cube means are beveled toward said rear side, whereby said cube means is reduced in volume without affecting image quality.

14. The display as claimed in claim 1, wherein a lens is placed between said rear projection screen and said said eyepiece means to achieve uniform brightness at a normal viewing position.

15. The display as claimed in claim 6, wherein color correction lens means are provided between said spherical mirror face and said diagonal beam splitter means for providing color correction.

16. The display as claimed in claim 7, wherein color correction lens means are provided between said spherical mirror face and said diagonal beam splitter means for providing color correction.

* * * * *